(12) United States Patent
Martin Cervera et al.

(10) Patent No.: US 7,840,570 B2
(45) Date of Patent: Nov. 23, 2010

(54) SYSTEM AND METHOD FOR ACQUIRING AND ADDING DATA ON THE PLAYING OF ELEMENTS OR MULTIMEDIA FILES

(75) Inventors: Francisco José Martin Cervera, Corvallis, OR (US); Enric Plaza I Cervera, Barcelona (ES)

(73) Assignee: Strands, Inc., Corvallis, OR (US)

( * ) Notice: Subject to any disclaimer, the term of this patent is extended or adjusted under 35 U.S.C. 154(b) by 96 days.

(21) Appl. No.: 11/918,943

(22) PCT Filed: Apr. 22, 2005

(86) PCT No.: PCT/ES2005/000213

§ 371 (c)(1),
(2), (4) Date: Jun. 6, 2008

(87) PCT Pub. No.: WO2006/114451

PCT Pub. Date: Nov. 2, 2006

(65) Prior Publication Data

US 2009/0083307 A1    Mar. 26, 2009

(51) Int. Cl.
*G06F 7/00* (2006.01)
(52) U.S. Cl. .................... 707/748; 707/757; 715/723
(58) Field of Classification Search .................... 707/3, 707/4, 748, 752
See application file for complete search history.

(56) References Cited

U.S. PATENT DOCUMENTS

| | | | |
|---|---|---|---|
| 5,355,302 A | 10/1994 | Martin | |
| 5,375,235 A | 12/1994 | Berry | |
| 5,483,278 A | 1/1996 | Strubbe | |
| 5,583,763 A | 12/1996 | Atcheson | |
| 5,724,521 A | 3/1998 | Dedrick | |
| 5,754,939 A | 5/1998 | Herz | |
| 5,758,257 A | 5/1998 | Herz | |
| 5,890,152 A | 3/1999 | Rapaport | |
| 5,918,014 A | 6/1999 | Robinson | |
| 5,950,176 A | 9/1999 | Keiser | |
| 6,000,044 A | 12/1999 | Chrysos | |
| 6,047,311 A | 4/2000 | Ueno | |
| 6,112,186 A | 8/2000 | Bergh | |
| 6,134,532 A | 10/2000 | Lazarus | |
| 6,345,288 B1 | 2/2002 | Reed | |
| 6,346,951 B1 | 2/2002 | Mastronardi | |
| 6,347,313 B1 | 2/2002 | Ma | |
| 6,349,339 B1 | 2/2002 | Williams | |
| 6,381,575 B1 | 4/2002 | Martin | |
| 6,430,539 B1 | 8/2002 | Lazarus | |
| 6,434,621 B1 | 8/2002 | Pezzillo | |
| 6,438,579 B1 | 8/2002 | Hosken | |
| 6,487,539 B1 | 11/2002 | Aggarwal | |
| 6,526,411 B1 | 2/2003 | Ward | |
| 6,532,469 B1 | 3/2003 | Feldman | |
| 6,577,716 B1 | 6/2003 | Minter | |
| 6,587,127 B1 | 7/2003 | Leeke | |
| 6,615,208 B1 | 9/2003 | Behrens | |
| 6,647,371 B2 | 11/2003 | Shinohara | |
| 6,687,696 B2 | 2/2004 | Hofmann | |
| 6,690,918 B2 | 2/2004 | Evans | |
| 6,704,576 B1 | 3/2004 | Brachman | |
| 6,748,395 B1 | 6/2004 | Picker | |
| 6,751,574 B2 | 6/2004 | Shinohara | |
| 6,785,688 B2 | 8/2004 | Abajian | |
| 6,842,761 B2 | 1/2005 | Diamond | |
| 6,850,252 B1 | 2/2005 | Hoffberg | |
| 6,914,891 B2 | 7/2005 | Ha | |
| 6,931,454 B2 | 8/2005 | Deshpande | |
| 6,941,324 B2 | 9/2005 | Plastina | |
| 6,947,922 B1 | 9/2005 | Glance | |
| 6,950,804 B2 | 9/2005 | Strietzel | |
| 6,987,221 B2 | 1/2006 | Platt | |
| 6,990,497 B2 | 1/2006 | O'Rourke | |
| 6,993,532 B1 | 1/2006 | Platt | |
| 7,020,637 B2 | 3/2006 | Bratton | |
| 7,021,836 B2 | 4/2006 | Anderson | |
| 7,051,352 B1 | 5/2006 | Schaffer | |

(Continued)

FOREIGN PATENT DOCUMENTS

EP    1 050 833 A2    8/2000

(Continued)

OTHER PUBLICATIONS

Dempster, Y., Laird, N., and Rubin, D. "Maximum Likelihood from Incomplete Data via the EM Algorithm". Jour. of the Royal Stat. Soc., Ser. B., 39:1047-1053, 1977.

(Continued)

*Primary Examiner*—Hosain T Alam
*Assistant Examiner*—Amy Ng
(74) *Attorney, Agent, or Firm*—Stolowitz Ford Cowger LLP

(57) ABSTRACT

The invention relates to a system and method for acquiring and aggregating information relating to the reproduction of multimedia files or elements in a database, said data including information relating to the number of multimedia file or element reproductions. The inventive system comprises a plurality of digital devices which can access and reproduce multimedia files and an acquisition and storage device which communicates with each of the digital devices in order to receive data from each of the identification/characterization programs, such that the identification/characterization program can count the reproductions at least in a direct and/or weighted manner.

19 Claims, No Drawings

U.S. PATENT DOCUMENTS

| | | |
|---|---|---|
| 7,072,846 B1 | 7/2006 | Robinson |
| 7,082,407 B1 | 7/2006 | Bezos |
| 7,096,234 B2 | 8/2006 | Plastina |
| 7,113,917 B2 | 9/2006 | Jacobi |
| 7,120,619 B2 | 10/2006 | Drucker |
| 7,127,143 B2 | 10/2006 | Elkins, II |
| 7,136,866 B2 | 11/2006 | Springer, Jr. |
| 7,139,723 B2 | 11/2006 | Conkwright |
| 7,174,126 B2 | 2/2007 | McElhatten et al. |
| 7,180,473 B2 | 2/2007 | Horie |
| 7,194,421 B2 | 3/2007 | Conkwright |
| 7,197,472 B2 | 3/2007 | Conkwright |
| 7,224,282 B2 | 5/2007 | Terauchi |
| 7,236,941 B2 | 6/2007 | Conkwright |
| 7,246,064 B1 | 7/2007 | Thomas |
| 7,256,341 B2 | 8/2007 | Plastina |
| 7,277,870 B2 | 10/2007 | Mourad |
| 7,302,419 B2 | 11/2007 | Conkwright |
| 7,302,468 B2 | 11/2007 | Wijeratne |
| 7,363,314 B2 | 4/2008 | Picker |
| 7,392,212 B2 | 6/2008 | Hancock |
| 7,403,769 B2 | 7/2008 | Kopra |
| 7,415,181 B2 | 8/2008 | Greenwood |
| 7,457,862 B2 | 11/2008 | Hepworth |
| 7,493,572 B2 | 2/2009 | Card |
| 7,505,959 B2 | 3/2009 | Kaiser |
| 7,546,254 B2 | 6/2009 | Bednarek |
| 7,568,213 B2 | 7/2009 | Carhart |
| 7,571,121 B2 | 8/2009 | Bezos |
| 7,571,183 B2 | 8/2009 | Renshaw |
| 7,574,422 B2 | 8/2009 | Guan |
| 7,574,513 B2 | 8/2009 | Dunning |
| 7,580,932 B2 | 8/2009 | Plastina |
| 7,599,847 B2 | 10/2009 | Block |
| 7,599,906 B2 | 10/2009 | Kashiwagi |
| 7,644,077 B2 | 1/2010 | Picker |
| 7,647,613 B2 | 1/2010 | Drakoulis |
| 7,657,493 B2 | 2/2010 | Meijer |
| 7,720,871 B2 | 5/2010 | Rogers |
| 7,725,494 B2 | 5/2010 | Rogers |
| 7,734,569 B2 | 6/2010 | Martin |
| 2001/0056434 A1 | 12/2001 | Kaplan |
| 2002/0002899 A1 | 1/2002 | Gjerdingen |
| 2002/0059094 A1 | 5/2002 | Hosea |
| 2002/0082901 A1 | 6/2002 | Dunning |
| 2002/0152117 A1 | 10/2002 | Christofalo |
| 2002/0178223 A1 | 11/2002 | Bushkin |
| 2002/0194215 A1 | 12/2002 | Cantrell |
| 2003/0033321 A1 | 2/2003 | Schrempp |
| 2003/0120630 A1 | 6/2003 | Tunkelang |
| 2003/0212710 A1 | 11/2003 | Guy |
| 2003/0229537 A1 | 12/2003 | Dunning |
| 2004/0002993 A1 | 1/2004 | Toussaint |
| 2004/0003392 A1 | 1/2004 | Trajkovic |
| 2004/0068552 A1 | 4/2004 | Kotz |
| 2004/0073924 A1 | 4/2004 | Pendakur |
| 2004/0128286 A1 | 7/2004 | Yasushi |
| 2004/0139064 A1 | 7/2004 | Chevallier |
| 2004/0148424 A1 | 7/2004 | Berkson |
| 2004/0153178 A1 | 8/2004 | Koch et al. |
| 2004/0247715 A1 | 12/2004 | Polson |
| 2005/0021470 A1* | 1/2005 | Martin et al. .................. 705/51 |
| 2005/0060350 A1 | 3/2005 | Baum |
| 2005/0075908 A1 | 4/2005 | Stevens |
| 2005/0091146 A1 | 4/2005 | Levinson |
| 2005/0102610 A1 | 5/2005 | Jie |
| 2005/0114357 A1 | 5/2005 | Chengalvarayan |
| 2005/0141709 A1 | 6/2005 | Bratton |
| 2005/0154608 A1 | 7/2005 | Paulson |
| 2005/0193014 A1 | 9/2005 | Prince |
| 2005/0193054 A1 | 9/2005 | Wilson |
| 2005/0195696 A1 | 9/2005 | Rekimoto |
| 2005/0198075 A1* | 9/2005 | Plastina et al. ........... 707/104.1 |
| 2005/0210101 A1 | 9/2005 | Janik |
| 2005/0216859 A1 | 9/2005 | Paek |
| 2005/0222989 A1 | 10/2005 | Haveliwala |
| 2005/0223039 A1 | 10/2005 | Kim |
| 2005/0235811 A1 | 10/2005 | Dukane |
| 2005/0256867 A1 | 11/2005 | Walther |
| 2005/0276570 A1 | 12/2005 | Reed |
| 2006/0001590 A1 | 1/2006 | Marcus |
| 2006/0018208 A1 | 1/2006 | Nathan |
| 2006/0020662 A1 | 1/2006 | Robinson |
| 2006/0026263 A1 | 2/2006 | Raghavan |
| 2006/0062094 A1 | 3/2006 | Nathan |
| 2006/0067296 A1 | 3/2006 | Bershad |
| 2006/0074750 A1 | 4/2006 | Clark |
| 2006/0080356 A1 | 4/2006 | Burges |
| 2006/0091203 A1 | 5/2006 | Bakker |
| 2006/0100978 A1 | 5/2006 | Heller |
| 2006/0123052 A1 | 6/2006 | Robbin |
| 2006/0136344 A1 | 6/2006 | Jones |
| 2006/0168616 A1 | 7/2006 | Candelore |
| 2006/0173910 A1 | 8/2006 | McLaughlin |
| 2006/0173916 A1 | 8/2006 | Verbeck Sibley |
| 2006/0195462 A1 | 8/2006 | Rogers |
| 2006/0195515 A1 | 8/2006 | Beaupre |
| 2006/0195516 A1 | 8/2006 | Beaupre |
| 2006/0195521 A1 | 8/2006 | New |
| 2006/0195789 A1 | 8/2006 | Rogers |
| 2006/0195790 A1 | 8/2006 | Beaupre |
| 2006/0253874 A1 | 11/2006 | Stark |
| 2006/0277098 A1 | 12/2006 | Chung |
| 2006/0282311 A1 | 12/2006 | Jiang |
| 2006/0288367 A1 | 12/2006 | Swix |
| 2007/0016507 A1 | 1/2007 | Tzara |
| 2007/0043829 A1 | 2/2007 | Dua |
| 2007/0100690 A1 | 5/2007 | Hopkins |
| 2007/0118546 A1 | 5/2007 | Acharya |
| 2007/0136264 A1 | 6/2007 | Tran |
| 2007/0156677 A1 | 7/2007 | Szabo |
| 2007/0203790 A1 | 8/2007 | Torrens |
| 2007/0244880 A1 | 10/2007 | Martin |
| 2007/0250429 A1 | 10/2007 | Walser |
| 2007/0250761 A1 | 10/2007 | Bradley |
| 2007/0271286 A1 | 11/2007 | Purang |
| 2007/0294096 A1 | 12/2007 | Randall |
| 2008/0004948 A1 | 1/2008 | Flake |
| 2008/0004990 A1 | 1/2008 | Flake |
| 2008/0027881 A1 | 1/2008 | Bisse |
| 2008/0046317 A1 | 2/2008 | Christianson |
| 2008/0077264 A1 | 3/2008 | Irvin |
| 2008/0133601 A1 | 6/2008 | Cervera |
| 2008/0155588 A1 | 6/2008 | Roberts |
| 2008/0220855 A1 | 9/2008 | Chen |
| 2008/0270221 A1 | 10/2008 | Clemens |
| 2009/0024504 A1 | 1/2009 | Lerman |
| 2009/0024510 A1 | 1/2009 | Chen |
| 2009/0073174 A1 | 3/2009 | Berg |
| 2009/0076939 A1 | 3/2009 | Berg |
| 2009/0076974 A1 | 3/2009 | Berg |
| 2009/0089222 A1 | 4/2009 | Ferreira |
| 2009/0106085 A1 | 4/2009 | Raimbeault |
| 2009/0210415 A1 | 8/2009 | Martin |
| 2009/0276368 A1 | 11/2009 | Martin |
| 2010/0161595 A1 | 6/2010 | Martin |
| 2010/0169328 A1 | 7/2010 | Hangartner |

FOREIGN PATENT DOCUMENTS

| | | |
|---|---|---|
| EP | 1 231 788 A1 | 8/2002 |
| EP | 1420388 A1 | 4/2004 |
| JP | 11-052965 | 2/1999 |
| JP | 2002-108351 A | 4/2002 |

| | | | |
|---|---|---|---|
| JP | 2002-320203 A | 10/2002 | |
| JP | 2003-255958 A | 9/2003 | |
| JP | 2004-221999 A | 8/2004 | |
| JP | 2005-027337 A | 1/2005 | |
| KR | 2002025579 | 4/2002 | |
| WO | WO 03051051 | 6/2003 | |
| WO | 2004/070538 A2 | 8/2004 | |
| WO | WO 2005013114 | 2/2005 | |
| WO | 2006/052837 A2 | 5/2006 | |
| WO | 2006/075032 | 7/2006 | |
| WO | 2006/114451 | 11/2006 | |
| WO | 2007/134193 A3 | 5/2007 | |
| WO | 2007/075622 A2 | 7/2007 | |
| WO | 2007/092053 A1 | 8/2007 | |
| WO | 2009/0149046 A1 | 12/2009 | |

OTHER PUBLICATIONS

Lazar, N.A.; Bayesian Empirical Likelihood; Technical Report, Carnegi Mellon University, Department of Statistics, 2000; 26 pages.

Hofmann, T. "Unsupervised Learning by Probabilistic Latent Semantic Analysis". Mach. Learn., 42:177-196, 2001.

PolyLens: A Recommender System for Groups of Users; M. O'Connor, D. Cosley, J.A. Konstan, J. Riedl; European Conference on Computer Supported Co-Operative Work at Bonn, Germany; Published 2001; pp. 199-218.

Platt, John C. et al., "Learning a Gaussian Process Prior for Automatically Generating Music Playlists," Microsoft Corporation {platt, cburgess, sswenson, chriswea}@microsoft.com, alcez@cs.berkeley.edu, 2002; pp. 1-9.

Hofmann, T. "Latent Semantic Models for Collaborative Filtering". ACM Transactions on Information Systems, 22:89-115, 2004.

Indyk, P. and Matousek, J. "Low-Distortion Embeddings of Finite Metric Spaces". In Handbook of Discrete and Computational Geometry, pp. 177-196. CRC Press, 2004.

Wolfers, Justin and Zitzewitz, Eric, Prediction Markets, Journal of Economic Perspectives, Spring 2004, pp. 107-126, vol. 18, No. 2.

Platt, John S., "Fasting Embedding of Sparse Music Similarity Graphs," Microsoft Corporation, {jplatt@microsoft.com}; 2004.

Toward alernative metrics of journal impact: a comparison of download and citation data, Johan Bollen, Herbert Van de Sompel, Joan Smith, Rick Luce, Google.com, 2005, pp. 1-2.

Das,A., Datar,M., Garg,A., and Rajaram,S. "Google News Personalization: Scalable Online Collaborative Filtering". In WWW '07: Proceedings of the 16th international conference on World Wide Web, pp. 271-280, New York, NY, USA, 2007. ACM Press.

Scihira, I. "A Characterization of Singular Graphs". Electronic Journal of Linear Algebra, 16:451-462, 2007.

Baluja, S., Seth, R., Sivakumar, D., Jing, Y., Yagnik, J., Kumar, S., Ravichandran, D., and Aly, M. "Video Suggestion and Discovery for YouTube: Taking Random Walks Through the View Graph". In WWW '08: Proceedings of the 17th international conference on World Wide Web, pp. 895-904, Beijing, China, 2008. ACM Press.

Dean, J. and Ghemawat, S. "MapReduce: Simplied Data Processing on Large Clusters". Commun. ACM, 51 (1): 107-113, 2008.

John Thompson, "A Graphic Representation of Interaction With the NEXIS News Database," MIT Thesis (May 1983).

Lippman, et al., "News and Movies in the 50 Megabit Living Room," IEEE/IEICE, Global Telecommunications Conference, pp. 1976-1981 (Nov. 15, 1987).

Bender, et al., "Newspace: Mass Media and Personal Computing," Proceedings of USENIX, Conference, pp. 329-348 (Summer 1991).

Lie, "The Electronic Broadsheet—All the News That Fits the Display," MIT Master's Thesis, pp. 1-96 (Jun. 1991).

Jonathan L. Orwant, "Doppelgänger: A User Modeling System," MIT Bachelor's Thesis (Jun. 1991).

"Communications of the ACM" Dec. 1992, vol. 35, No. 12 at pp. 26-28 (Introduction to special issue regarding Workshop on High Performance Information Filtering, Morristown, N. J. Nov. 1991).

Jon Orwant, "Appraising the User of User Models: Doppelgänger's Interface," in: A. Kobsa and D. Litman (eds.), Proceeding of the 4th International Conference on User Modeling (1994).

"Lessons from LyricTimeTM: A Prototype Multimedia System" 4th IEEE ComSoc International Workshop on Multimedia Communications (Apr. 1992).

Delivering Interactive Multimedia Documents over Networks; Shoshana Loeb; IEEE Communications Magazine; May 1992; 8 pages.

Belkins, et al., "Information Filtering and Information Retrieval: Two Sides of the Same Coin?", Communications of the ACM (Dec. 1992).

Architecting Personalized Delivery of Multimedia Information,: Communications of the ACM (Dec. 1992).

Jonathan L. Orwant, "Doppelgänger Goes to School: Machine Learning for User Modeling," MIT Master of Science Thesis (Sep. 1993).

Pachet, Francois, A Taxonomy of Musical Genres, Content-Based Multimedia Information Access Conference (RIOA), Paris, Apr. 2000, 8 pages.

Smart Computing, "The Scoop on File-Sharing Services," Dec. 2000, vol. 11, Issue 12; pp. 30-33 in printed issue. Available at www.smartcomputing.com/editorial/article.asp?article=articles%02F2000%Fs1112%2F08s12.asp.

Carlson et al. "Internet Banking Market Developments and Regulatory Issues in the New Economy: What Changed, and the Challenges for Economic Policy . . . "; May 2001; http://www.occ.gov/netbank/SGEC2000.pdf.

Bender, "Twenty Years of Personalization: All about the Daily Me," Educause Review (Sep./Oct. 2002).

Apple: iTunes 4.2 User Guide for Windows; Dec. 2003; retrieved from the internet: URL: http://www2.austin.cc.tx. us/tcm/projects/itunes.pdf; pp. 10, 17-19.

Deshpande, Mukund, et al., "Item-Based Top-N. Recommendation Algorithms," ACM Transactions on Information Systems, 22:1 (Jan. 2004), pp. 143-177.

Augmenting the Social Space of an Academic Conference; McCarthy, et al. Information School, University of Washington and Department of Computer Science and Engineering, University of Minnesota; pp. 1-10; Nov. 6-10, 2004.

Toward University Mobile Interaction for Shared Displays; Tim Paek, et al.; Microsoft Research, Redmond, WA; pp. 1-4; Nov. 6-10, 2004.

The Trustees of Indiana University, Variations2, The Indiana University Digital Music Library, http://dml.indiana.edu/, last updated May 11, 2005, 1 page.

PCT/ES2005/00003 Written Opinion of the International Searching Authority Report dated Jun. 10, 2005.

"New Music Recommendation System is Based on FOAF Personal Profiling," www.masternewmedia.org/music_recommendation/music_recommendation_system_FOAF, Oct. 1, 2005.

Co-Construction of Hybrid Spaces; Asa Rudstrom; A Dissertation submitted to the University of Stockholm in partial fulfillment of the requirements for the Degree of Doctor of Philosophy; Department of Computer and Systems Sciences Stockholm University and Royal Institute of Technology; pp. 1-69; Nov. 2005.

MobiLenin—Combining A Multi-Track Music Video, Personal Mobile Phones and a Public Display into Multi-User Interactive Entertainment; Jurgen Scheible, et al. Media Lab, University of Art and Design, Helsinki, Finland; pp. 1-10; Nov. 6-10, 2005.

PCT/US2006/003795; International Search Report and Written Opinion of International Application, dated May 28, 2008.

"Social Networking Meets Music Listening: Mecora Launches Radio 2.0," www.masternewmedia.org/news/2006/04/13/social_networking_meets_music_listening.htm, Apr. 13, 2006.

www.rfidjournal.com/article/articleview/1619/1/1, Web Page, RFID brings messages to Seattle side walks on RFID system being deployed next week will send marketing and assistive information to users carrying active RFID tags. RFID Journal (pp. 1-4).

Alvear, Jose, "Risk-Free Trial Streaming Media Delivery Tools," Streaming Media.com; www.streamingmedia.com/article.ap?id=5768, Jun. 30, 2000.

www.akoo.com/Akoo/, Web Page, AKOO, Pick the Music, Waiting in the line at the Theme Park, Introducing the m-Venue™ platform.

www.alwayson-network.com/comments.php?id=P12663 0 37 0 C, Web Page, Not Your Average Jukebox, on Hollywood 1000 contender Ecast uses broadbank to being the digital media experience to your watering hole.

www.axcessnews.com/modules/wfsection/article. php?articleid=8327, Web Page, Feb. 24, 2006, Maintenance Fees, Digital Music Sales Triple to $1.1 Billion in 2005.

www.bmi.com/news/200403/20040324b.asp, Web Page, BMI™ Figures Don'T Lie, Mar. 24, 2004, Touch Tunes Signs License Agreement for BMI Music in Digital Jukeboxes.

www.ecastinc.com/music_licensing.html, Web Page, Ecast Network, interactive entertainment network, Music/Licensing.

www.roweinternational.com/jukeboxes_dia.html, Web Page, Digital Internet Access Jukeboxes, Rowe International.

www.touchtunes.com, Web Page, Touchtunes, Turn your ROWE 100A's and 100B's into touch tunes Digital Jukeboxes—BOSE.

PCT/US2006/048330; International Bureau; PCT Search Report and Written Opinion; Mar. 20, 2008; 10 pages.

IP City, Integrated Project on Interaction and Presence on Urban Environments-Demonstrators on Large-Scale Events Applications; ipcity.eu; Giulio Jacucci, John Evans, Tommi Ilmonen; pp. 1-37; Feb. 9, 2007.

PCT/US2006/034218; USPTO Search Authority; PCT International Search Report; Feb. 9, 2007.

PCT/ES2005/00003 Written Opinion of the International Preliminary Examining Authority dated Mar. 19, 2007.

PCT/US2007/068708; International Search Report; May 10, 2007.

PCT/ES2005/00003 International Preliminary Report on Patentability (Ch II) Report dated May 22, 2007.

Incremental tensor analysis: theory and applications, Jimeng Sun, Dacheng Tao, Spiros Papadimitriou, Philip Yu, Christos Faloutsos, ACM, Oct. 2008, pp. 1-37.

ShopSmart: Product Recommendations through Technical Specifications and User Reviews; Alexander Yates et al. Temple University; CIKM; Oct. 26-30, 2008, Napa Valley, CA, USA; 2 pages.

PCT/US07/068708; Filed May 10, 2007; International Search Report and Written Opinion; WO 2007/134193; Dec. 7, 2007.

PCT/US09/42002; Filed Apr. 28, 2009; International Search Report and Written Opinion; Jun. 2009.

PCT/US09/45911; Filed Jun. 2, 2009; International Search Report and Written Opinion.

Industry Standard, The, Help FAQs for Standard Prediction Market, http://www.thestandard.com/help, downloaded Jun. 29, 2009.

PCT/US2007/09/45725; International Search Report_WO; Jul. 15, 2009.

International Search Report PCT/US2009/051233; Sep. 4, 2009; Strands, Inc.

PCT/US2006/004257 European Search Report Oct. 23, 2009.

IEEE, no matched results, Nov. 1, 2009, 1 page.

Strands Business Solutions. "Integration Document v.2.0"; Published May 2008; [online retrieved on Jan. 21, 2010] Retrieved from the internet <URL: http://recommender.strands.com/doc/SBS-Integration-Document.pdf>; entire document-18 pages.

PCT/US09/68604 International Search Report and Written Opinion of the International Searching Authority; dated Feb. 17, 2010.

Tom Bunzel, "Easy Digital Music," QUE Publisher, Aug. 18, 2004, Chapters 5 and 8.

* cited by examiner

SYSTEM AND METHOD FOR ACQUIRING AND ADDING DATA ON THE PLAYING OF ELEMENTS OR MULTIMEDIA FILES

CROSS-REFERENCE TO RELATED APPLICATION

This application is a 371 of PCT/ES2005/000213, filed Apr. 22, 2005; the disclosure of which is incorporated herein by reference.

FIELD OF THE INVENTION

The present invention relates to a system and method for acquiring and adding information on the playing of elements or multimedia files to a database, this data including information referring to the number of plays of said elements or multimedia files.

BACKGROUND

The playing of elements or multimedia files by users in all types of digital devices has increased considerably in recent years due to the increasingly better size vs. quality ratio existing found therein due to the progress in compression codes and programs, as well as the appearance in the market of all types of devices suitable for playing them.

Proposals directed towards controlling said plays to a certain extent have been carried out for different purposes, counting them in order to achieve better management of said multimedia files and/or greater control.

U.S. Pat. No. 5,355,302 relates to a system for managing, from a central station, a plurality of jukeboxes found in different locations, with which it is communicated through a two-way communications link used to both send a series of songs to each jukebox together with the identifying information associated to each one of them, and to receive data referring to the use of said songs from each jukebox.

Information referring to the number of plays of each song in each jukebox is among said data received from each jukebox, with the aim of replacing the songs when it is considered to be necessary according to the number of times they have been played, amongst other factors.

The application of said patent is very specific because it is focused only on the control of such type of machines, which are accessed by multiple users, therefore the counts carried out, which are only direct, are carried for each jukebox without distinguishing the users who have played the songs to be counted.

U.S. Pat. No. 5,464,946 relates to a system for interactive multimedia entertainment in which a plurality of songs and/or videos are stored and allows receiving information concerning the cost of each song and other relevant information. In one of its embodiments, the system comprises receiving means suitable for counting the number of plays of each song for the purpose of charging the recipient a price per play.

In both the aforementioned background documents, the count of the plays is direct and its aim is to manage the supply of the songs (or videos) to either replace them when they have been played a certain number of times or to charge a price for them, also according to the number of plays.

BRIEF DRAWINGS DESCRIPTION

No drawings are included in the application.

DETAILED DESCRIPTION

It is necessary to offer an alternative to the state of the art that proposes carrying out more elaborate counts than those currently existing therein, and not necessarily focused on the direct management of the songs (supply, cost, etc.) but on acquiring information on the tastes of a plurality of users according to the times they play the multimedia pieces and another series of parameters.

The present invention relates, in a first aspect, to a system for acquiring and adding information on the playing of elements or multimedia files (such as musical pieces, videos and elements that can be used by multimedia games) to a database comprising: a plurality of digital devices suitable for accessing and playing said multimedia files, each one of them having installed an identification-characterization program suitable for at least identifying and counting the number of complete or partial plays of each file and which device they have been played in, at least one acquiring and storing device communicated to each one of the said digital devices for at least receiving data from each one of said identification-characterization programs, said data including at least the result of the mentioned play counts.

The fact that the mentioned identification-characterization program is suitable for counting said plays in at least a direct and/or weighted manner, as will be explained below, must be emphasized.

The mentioned acquiring and storing device comprises a database with information referring to a plurality of users in the form of user profiles and is suitable for adding said data from said identification-characterization programs to a database, associating said data to the corresponding profiles of users using the digital devices in which the respective identification-characterization programs are arranged, which enables carrying out classifications or rankings.

Said digital devices can be quite varied, from a personal computer to a portable player (for example of MP3 files), as well as mobile telephones, personal digital agendas (PDAs), etc, each one of them preferably having a memory for recording the multimedia files to be played.

On the other hand, even though the counts are carried out for each digital device, a user can have or use two or more devices, which is taken into account when the information from each identification-characterization program, generally one program per device, is associated and added to a database to their corresponding user profile.

Generally, digital devices are distributed in different local or geographical areas and communicated with the mentioned acquiring and storing device through any known communications network.

For one embodiment, the multimedia files are grouped in a series of groups and the identification-characterization program is suitable for counting the number of plays of each file, taking into account the group or groups they belong to.

Preferably said groups have been established according to one or more contexts identified by means of said identification-characterization program and related to the multimedia files, such as those referring to:

time interval: this week, last week, this month, last year, etc;

type of element or multimedia file: musical prices, videos, etc;

musical or cinematographic genre of the multimedia file: funk, acid jazz, rock, comedy, suspense, etc;

geographical location: France, USA, California, etc;

data of the user owning the device: age, gender, etc or other data that he/she consents to supply;

author of the file: Rolling Stones, Hitchcock, etc; or a combination of several of said contexts.

As was set forth above, with the results of the counts it is possible to carry out a classification or ranking based on or more of the mentioned contexts, such as for example the ten most played songs of the Rolling Stones, ordered from most played to least played, etc.

As regards the weighted count mentioned above, the identification-characterization program is suitable for carrying it out taking into account, alone or in combination with said groups, a weight assigned to each digital device or user, said weight having been assigned according to the total number of files available in each digital device, preferably because they have been recorded in the memory thereof, or available to each user in the event that each user has or uses two or more digital devices.

The identification-characterization program is suitable for assigning a value to said weight directly proportional to said total number of files if said total number of files is less than a predetermined threshold value known by the program, and for assigning a value to said weight equal to that of the said predetermined threshold if said total number of files is more than said predetermined threshold value known by the program.

It is therefore achieved that the opinion of a user having more multimedia pieces susceptible of being played than another one is more important, as long as the number of pieces does not exceed the mentioned predetermined threshold.

The aim of the limit marked by the mentioned predetermined threshold is to prevent giving an excessive weight to a user having an exaggerated number of multimedia pieces.

For example, a user can have 20 songs and play them very frequently and a second user can have 10,000 songs and play 100 frequently this week. For this example, a higher weight would be assigned to the songs of the second user than to those of the first one, on the other hand, if the mentioned number of 10,000 were the one marking the mentioned predetermined threshold value, if a third user had, for example, 15,000 songs, the third user would be assigned the same weight as the second user.

The mentioned acquiring and storing system is suitable for carrying out the mentioned addition to a database such that it enables carrying out said classifications or rankings, taking into account said groups or contexts and/or said assigned weights.

As regards the multimedia files, these can be any files that are within such denomination for a person skilled in the art, such as musical pieces, videos and elements that can be used by multimedia games.

In a second aspect, the invention relates to a method for acquiring and adding data on the playing of elements or multimedia files, comprising:

a) accessing and playing said multimedia files by each one of a plurality of digital devices, b) counting the number of plays of each one of said multimedia files, at least in a direct and/or weighted manner, in each digital device, and c) sending at least the results of said counts to at least one remote acquiring and storing device communicated with each one of said devices.

Preferably, said step b) comprises carrying out a plurality of counts for a corresponding plurality of groups of multimedia files, taking into account the group or groups they belong to, said groups having been established generally according to the contexts indicated while explaining the first aspect of the present invention.

For one embodiment, step b) is carried out by means of a series of corresponding identification-characterization programs similar to those comprised by the system proposed in the first aspect of the present invention.

The proposed method comprises assigning a value of weight or importance to each digital device or to each user according to the number of multimedia files available in each digital device or available to each user, in a manner similar to that described previously for the system.

Once said weights have been assigned, the method comprises operating said results of said counts with said assigned weight, and sending the results to said acquiring and storing device.

For a preferred embodiment, the method comprises carrying out said weighted count taking into account, alone or in combination with said groups or contexts, said weight assigned to each digital device or to each user.

The method comprises adding the results of said counts which have been sent to said acquiring or storing device and associating them to a series of user profiles referring to the users using said digital devices.

For another embodiment, the proposed method comprises carrying out several classifications or rankings with said sent and/or added results, taking into account said groups or contexts and/or said assigned weights.

The system proposed by the first aspect of the present invention and suitable for being used according to the proposed method is generally formed by an infrastructure formed by a remote management centre or platform, comprising the mentioned acquiring and storing system and a network of digital devices communicated with said platform.

It is assumed that the users have installed the identification-characterization program and have been registered as such in the mentioned platform, and the program sends the mentioned data to the platform when the users are connected thereto by means of their respective digital devices.

By means of the present invention, it is possible to have a system of counters generally associated to contexts, in an individualized and customized manner for each user, taking into account the importance of each user according to the number of pieces he or she has, therefore the user profiles obtained are much more complete than those obtained to date by the state of the art.

A person skilled in the art can introduce changes and modifications in the embodiments described without departing from the scope of the invention as defined in the enclosed claims.

The invention claimed is:

1. A method, comprising:

generating a weight associated with each of a plurality of devices proportional to a total number of multimedia files accessible to the corresponding one of the plurality of devices in response to the total number of multimedia files being less than a threshold, otherwise setting the weight equal to the threshold;

generating a count of complete or partial plays for each of the multimedia files accessible to the plurality of devices;

generating a weighted count for each of the multimedia files accessible to the plurality of devices by applying the weight associated with the corresponding device to the respective count for each of the plurality of multimedia files accessible to the plurality of devices;

classifying each of the multimedia files according to its weighted count;

storing an indication of the classification of each multimedia file in association with the corresponding multimedia file;

storing, in a memory accessible to the plurality of devices, a plurality of user profiles associated with a corresponding plurality of users of one or more of the plurality of devices; and associating, in the memory, the weighted count for each of the multimedia files with a user profile corresponding to a user that played or partially played the multimedia file.

2. The method of claim 1, wherein each of the plurality of devices includes a memory device configured to store the plurality of multimedia files accessible to the corresponding device.

3. The method of claim 1, wherein each of the plurality of devices includes a personal computer, portable player, mobile telephone, or personal digital assistant.

4. The method of claim 1, further including associating the count of complete or partial plays of the plurality of multimedia files with a device in which the complete or partial plays occurred.

5. The method of claim 1, wherein classifying the plurality of multimedia files accessible to the plurality of the devices includes grouping the plurality of multimedia files in response to a criteria.

6. The method of claim 5, wherein the criteria includes at least one of a play time, a type of multimedia file, a genre of the multimedia file, geographic location of the device, user data, or metadata of the multimedia file.

7. A system comprising:
a server; and
a plurality of remote devices configured to communicate with the server over a network; wherein each remote device is configured to:
play a plurality of locally stored multimedia files one at a time; and
transmit a count of complete or partial plays for each of the multimedia files; and
wherein the server is configured to:
generate a weight associated with each of the remote devices proportional to a total number of multimedia files accessible to the corresponding one of the remote devices responsive to the total number of multimedia files being less than a threshold, otherwise setting the weight equal to the threshold;
generate a weighted count for each of the multimedia files accessible to each of the remote devices by applying the weight associated with the corresponding remote device to the respective count for each of the multimedia files accessible to the remote devices;
classify each of the multimedia files according to the its weighted count; and
store an indication of the classification of each multimedia file in association with the corresponding multimedia file;
store, in a memory device, a plurality of user profiles associated with a corresponding plurality of users of one or more of the plurality of remote devices; and
associate, in the memory device, the weighted count for each of the multimedia files with a user profile corresponding to a user that played or partially played the multimedia file.

8. The system of claim 7, wherein each of the remote devices includes a internal memory device configured to locally store the multimedia files.

9. The system of claim 7, wherein the plurality of remote devices includes at least one of a personal computer, portable player, mobile telephone, or personal digital assistant.

10. The system of claim 7, wherein the server includes a memory device accessible to the plurality of remote devices and configured to store the indication of the classification.

11. The system of claim 9, wherein the server is further configured to associate the count of complete or partial plays for each of the multimedia files with the remote device in which the complete or partial plays occurred.

12. The system of claim 7, wherein the server is further configured to group the plurality of multimedia files in response to a criteria.

13. The system of claim 12, wherein the criteria includes at least one of a play time, a type of multimedia file, a genre of the multimedia file, geographic location of the device, user data, or metadata of the multimedia file.

14. An article of manufacture comprising a computer-readable medium having stored thereon computer executable instructions that configure a processing device to:
generate a weight associated with each of a plurality of devices proportional to a total number of multimedia files accessible to the corresponding one of the plurality of devices in response to the total number of multimedia files being less than a threshold, otherwise setting the weight equal to the threshold;
generate a count of complete or partial plays for each of the multimedia files accessible to the plurality of devices;
generate a weighted count for each of the multimedia files accessible to the plurality of devices by applying the weight associated with the corresponding device to the respective count for each of the plurality of multimedia files accessible to the plurality of devices;
classify each of the multimedia files according to its weighted count;
cause the storage of an indication of the classification of each multimedia file in association with the corresponding multimedia file;
store, in a memory accessible to the plurality of devices, a plurality of user profiles associated with a corresponding plurality of users of one or more of the plurality of devices; and
associate, in the memory, the weighted count for each of the multimedia files with a user profile corresponding to a user that played or partially played the multimedia file.

15. The article of manufacture of claim 14, wherein each of the plurality of devices includes a memory device configured to store the plurality of multimedia files accessible to the corresponding device.

16. The article of manufacture of claim 14, wherein each of the plurality of digital devices includes a personal computer, portable player, mobile telephone, or personal digital assistant.

17. The article of manufacture of claim 14, wherein the executable instructions further configure the processing device to associate the count of complete or partial plays of the plurality of multimedia files with the corresponding device in which the complete or partial plays occurred.

18. The article of manufacture of claim 14, wherein the executable instructions further configure the processing device to group the plurality of multimedia files in response to a criteria.

19. The article of manufacture of claim 18, wherein the criteria includes at least one of a play time, a type of multimedia file, a genre of the multimedia file, geographic location of the device, user data, or metadata of the multimedia file.

* * * * *